United States Patent
Dao et al.

(10) Patent No.: US 8,552,700 B2
(45) Date of Patent: Oct. 8, 2013

(54) SWITCHED MODE VOLTAGE REGULATOR AND METHOD OF OPERATION

(75) Inventors: Chris C. Dao, Pflugerville, TX (US); Stefano Pietri, Austin, TX (US); Juxiang Ren, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 423 days.

(21) Appl. No.: 12/899,195

(22) Filed: Oct. 6, 2010

(65) Prior Publication Data

US 2012/0086423 A1 Apr. 12, 2012

(51) Int. Cl.
*G05F 1/575* (2006.01)

(52) U.S. Cl.
USPC .............. 323/282; 323/284; 323/901

(58) Field of Classification Search
USPC .......... 323/282, 284, 901; 363/21.1, 21.11, 363/21.18, 49
See application file for complete search history.

(56) References Cited

U.S. PATENT DOCUMENTS

| | | | |
|---|---|---|---|
| 4,057,842 A | 11/1977 | Bauman et al. | |
| 4,204,148 A | 5/1980 | Gaertner | |
| 4,209,738 A | 6/1980 | Nuver et al. | |
| 4,353,114 A | 10/1982 | Saleh | |
| 4,390,831 A | 6/1983 | Byrd et al. | |
| 4,405,975 A | 9/1983 | Overstreet et al. | |
| 4,621,313 A | 11/1986 | Kiteley | |
| 5,233,508 A | 8/1993 | Yamamura et al. | |
| 5,357,418 A * | 10/1994 | Clavel | 363/89 |
| 5,426,350 A | 6/1995 | Lai | |
| 5,499,154 A | 3/1996 | Cullison | |
| 5,903,451 A | 5/1999 | Wu et al. | |
| 5,969,957 A | 10/1999 | Divan et al. | |
| 6,101,106 A | 8/2000 | Shi | |
| 6,154,375 A | 11/2000 | Majid et al. | |
| 6,301,135 B1 | 10/2001 | Mammano et al. | |
| 6,344,980 B1 | 2/2002 | Hwang et al. | |
| 6,469,914 B1 | 10/2002 | Hwang et al. | |
| 6,815,938 B2 * | 11/2004 | Horimoto | 323/282 |
| 6,853,565 B1 | 2/2005 | Liao | |
| 6,894,910 B1 * | 5/2005 | Wu | 363/79 |
| 6,933,710 B2 * | 8/2005 | Shieh | 323/282 |
| 6,954,056 B2 | 10/2005 | Hoshino et al. | |
| 7,023,713 B2 | 4/2006 | Liao | |
| 7,158,394 B2 | 1/2007 | Takahashi et al. | |
| 7,218,080 B2 | 5/2007 | Yang | |
| 7,262,582 B2 | 8/2007 | Warita et al. | |
| 7,315,954 B2 | 1/2008 | Van Lieu et al. | |
| 7,402,987 B2 * | 7/2008 | Lopata | 323/282 |
| 7,646,989 B2 | 1/2010 | Kato | |
| 7,652,898 B2 | 1/2010 | Kim et al. | |

(Continued)

*Primary Examiner* — Adolf Berhane
*Assistant Examiner* — Fred E Finch, III
(74) *Attorney, Agent, or Firm* — Joanna G. Chiu; Daniel D. Hill

(57) ABSTRACT

A voltage regulator includes a transistor, a comparator, and a compensation circuit. The comparator has a first input terminal coupled to receive a clock signal, a second input terminal, and an output terminal coupled to a control electrode of the transistor. The compensation circuit has a first input terminal coupled to receive a reference voltage, a second input terminal coupled to the output terminal of the voltage regulator, and an output terminal coupled to the second input terminal of the comparator. The compensation circuit has a filter circuit. The filter circuit has a first RC time constant during startup of the voltage regulator, and the filter circuit has a second RC time constant during normal operation. Changing the RC time constant for startup prevents an overshoot of an output voltage of the voltage regulator.

18 Claims, 2 Drawing Sheets

(56) References Cited

U.S. PATENT DOCUMENTS

| | | |
|---|---|---|
| 7,692,939 B2 | 4/2010 | Bucheru |
| 7,699,053 B1 | 4/2010 | Johnson et al. |
| 2005/0088466 A1* | 4/2005 | Smith et al. ........................ 347/5 |
| 2005/0206360 A1* | 9/2005 | Mehas et al. .................. 323/282 |
| 2009/0206810 A1* | 8/2009 | Chellamuthu et al. ........ 323/282 |
| 2009/0289569 A1* | 11/2009 | Yoshida et al. ................ 315/246 |
| 2010/0045252 A1* | 2/2010 | Yamamoto .................... 323/282 |
| 2010/0134085 A1* | 6/2010 | Nishida ......................... 323/285 |

\* cited by examiner

SWITCHED MODE VOLTAGE REGULATOR AND METHOD OF OPERATION

BACKGROUND

1. Field

This disclosure relates generally to regulators, and more specifically, to a switched mode voltage regulator.

2. Related Art

Switched mode voltage regulators are commonly used as power supplies. However, upon power-up, these power supplies may have very fast ramp rate or may overshoot which may cause various problems. For example, the very fast ramp rate may trigger centralized electrostatic discharge (ESD) protection, which may result in a reset before completion of the power-up. The overshoot may result in an over voltage condition which may cause long term reliability problems. Therefore, a need exists for a switched mode voltage regulator with improved overshoot and ramp rate control.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
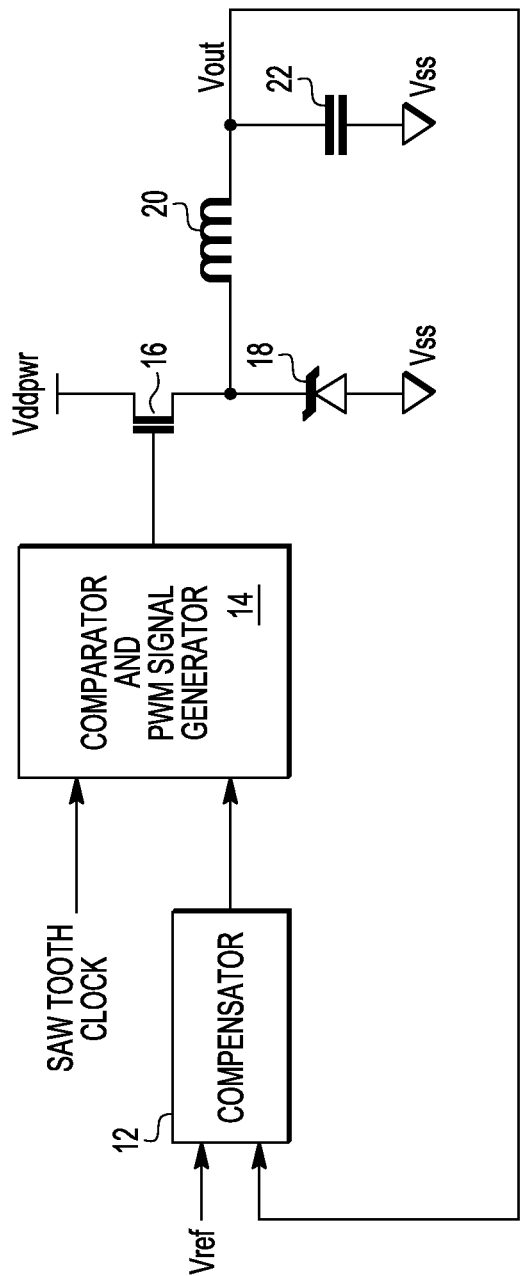
FIG. 1 illustrates, in block diagram form, a switched mode voltage regulator in accordance with an embodiment of the present invention.

In one embodiment, a switched mode voltage regulator includes a compensator which provides an output for comparison with a saw tooth clock. The result of this comparison is used to generate a pulse width modulated (PWM) signal for controlling a transistor which regulates an output voltage of the voltage regulator. In one embodiment, the compensator uses the output voltage and a reference voltage to provide an integration error as its output. The compensator applies a filter having a resistor-capacitor (RC) time constant to the output voltage prior to comparison with the reference voltage. In one embodiment, the RC time constant has a particular value during normal operation, but an increased value during start-up of the voltage regulator. The increased value of the RC time constant allows for a slower ramp up of the integration error as compared to the ramp up which would occur with the RC time constant allowed during normal operation. In this manner, the duty cycle of the PWM which controls the transistor is allowed to increase more slowly, thus reducing the possibility of an overly fast ramp rate of the regulated supply and detrimental overshoot. Furthermore, in one embodiment, the integration error is clamped at a particular value which helps ensure that the output of the compensator does not exceed the peak of the saw tooth clock. This may further prevent the possibility of an overly fast ramp rate and overshoot.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

As used herein, when a switch is "on" or "closed", it is in its electrically conductive state, and when a switch is "off" or "open", it does not electrically conduct. Also the capacitors described herein each have a first plate electrode and a second plate electrode which may be referred to as a first terminal of the capacitor and a second terminal of the capacitor, respectively.

FIG. 1 illustrates a switched mode voltage regulator 10 in accordance with one embodiment of the present invention. In one embodiment, switched mode voltage regulator 10 may be referred to as a closed loop regulator system. Regulator 10 includes a compensator 12, a comparator and pulse width modulated (PWM) signal generator 14, a transistor 16, a schottky diode 18, an inductor 20, and a capacitor 22. Compensator 12 (which may also be referred to as a compensation circuit) receives a reference voltage, Vref, and the output voltage of regulator 10, Vout, and provides an output to comparator and PWM generator 14. In one embodiment, Vref is a bandgap generated reference voltage. Comparator and PWM generator 14 also receives a clock signal (in the illustrated embodiment, the clock signal is a saw tooth clock) and provides a PWM signal to a control electrode of transistor 16. A first current electrode is connected to a first power supply terminal which receives a first power supply, Vddpwr. A second current electrode of transistor 16 is connected to a cathode of diode 18 and an anode of diode 18 is connected to a second power supply terminal which is connected to ground, Vss. The second current electrode of transistor 16 is also connected to a first terminal of inductor 20. A second terminal of inductor 20 provides Vout and is connected to a first terminal of capacitor 22. A second terminal of capacitor 22 is connected to the second power supply terminal. In one embodiment, diode 18 can be implemented as a semiconductor device having a first current electrode coupled to the second current electrode of transistor 16, and a second current electrode coupled to Vss. Note that inductor 20 and capacitor 22 form an inductor-capacitor (LC) circuit which is coupled to the output terminal, Vout, of regulator 10.

In operation, the PWM signal output by comparator and PWM signal generator 14 turns transistor 16 on and off, which controls the voltage level of Vout. Vout is fed back to compensator 12 which compares Vout to Vref and provides an output accordingly to comparator and PWM signal generator 14. Comparator and PWM signal generator 14 compares the output of compensator 12 with the saw tooth clock to generate the PWM signal to transistor 16. Compensator 12 ensures stability within the closed loop of regulator 10. As will be described with respect to FIG. 2, compensator 12 includes a resistor-capacitor (RC) filter having an adjustable RC time constant. This RC time constant has a first value during start-up and a second value during normal operation. During startup, the value of the RC time constant is increased which results in a decrease of the bandwidth of the closed loop regulator system 10. After start-up and upon entry into normal operation, the value of the RC time constant is decreased back to its normal operation value in order to increase the bandwidth of the closed loop regulator system. In one embodiment, start-up refers to the period of time after reset or power-up during which the circuit is attempting to stabilize to a steady state, and normal operation refers to the time after completion of start-up, at which point the power supplies of the circuit are in a predetermined expected range.

In one embodiment, comparator and PWM signal generator 14 includes an interface between a lower power domain (such as the domain which powers compensator 12) and a higher power domain (such as the domain which powers the external devices). In one embodiment, compensator 12 and comparator and PWM signal generator 14 are located within an integrated circuit while transistor 16, diode 18, inductor 20, and capacitor 22 are external devices located external to the integrated circuit. Therefore, comparator and PWM signal generator 14 may include a comparator (powered by the lower power domain) for comparing the output of compensator 12 with the saw tooth clock, a level shifter which shifts the output of the comparator to a voltage level for the higher power domain, and a PWM generator which uses the level shifted output of the comparator to generate the PWM signal for controlling transistor 16.

Figure 2:
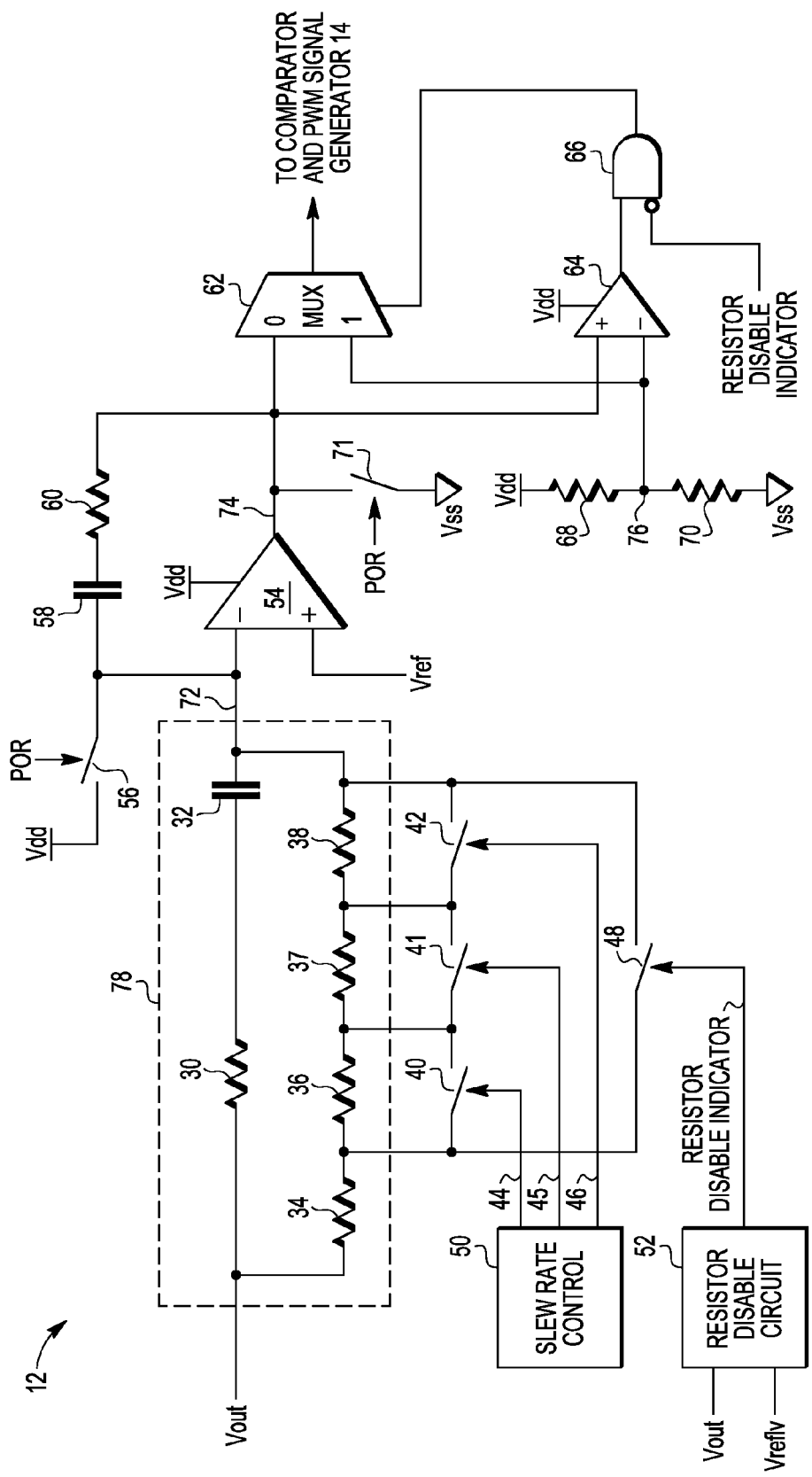
FIG. 2 illustrates, in partial schematic and partial block diagram form, a compensator of the switched mode voltage regulator of FIG. 1, in accordance with an embodiment of the present invention.

FIG. 2 illustrates, in partial schematic and partial block diagram form, compensator 12 in accordance with one embodiment of the present invention. Compensator 12 includes resistors 60, 30, 34, 36, 37, 38, 68, and 70, capacitors 58 and 32, a filter 78, switches 56, 40, 41, 42, 48, and 71, a slew rate control 50, a resistor disable circuit 52, an operational amplifier 54, a multiplexor (MUX) 62, a comparator 64, and an AND gate 66. Vout is connected to a first terminal of resistor 30 and to a first terminal of resistor 34. A second terminal of resistor 30 is connected to a first terminal of capacitor 32. A second terminal of capacitor 32 is connected to a negative input of amplifier 54. A second terminal of resistor 34 is connected to a first terminal of resistor 36, a second terminal of resistor 36 is connected to a first terminal of resistor 37, a second terminal of resistor 37 is connected to a first terminal of resistor 38, and a second terminal of resistor 38 is connected to the negative input of amplifier 54. Filter 78 (also referred to as an RC filter or a filter circuit) includes resistors 30, 34, and 36-38 and capacitor 32. A positive input of amplifier 54 is coupled to receive Vref. The first terminal of resistor 36 is connected to a first current terminal of switch 40 and a second current terminal of switch 40 is connected to the second terminal of resistor 36. The first terminal of resistor 37 is connected to a first current terminal of switch 41 and a second current terminal of switch 41 is connected to the second terminal of resistor 37. The first terminal of resistor 38 is connected to a first current terminal of switch 42 and a second current terminal of switch 42 is connected to the second terminal of resistor 38. The first terminal of resistor 36 is connected to a first current terminal of switch 48 and a second current terminal of switch 48 is connected to the second terminal of resistor 38. Slew rate control 50 provides switch control signals 44, 45, and 46 to the control terminals of switches 40, 41, and 42, respectively. Resistor disable circuit 52 provides a resistor disable indicator to a control terminal of switch 48.

A first current terminal of switch 56 is connected to a third power supply terminal which receives a third power supply, Vdd. In one embodiment, Vdd is less than Vddpwr and powers the lower power domain while Vddpwr powers the higher power domain. A control terminal of switch 56 is coupled to receive a power-on-reset (POR) signal. A second current terminal of switch 56 is connected to the negative input of amplifier 54 and to a first terminal of capacitor 58. A second terminal of capacitor 58 is connected to a first terminal of resistor 60. A second terminal of resistor 60 is connected to an output of amplifier 54. The output of amplifier 54 is connected to a first current terminal of switch 71 and a second current terminal of switch 71 is connected to the second power supply terminal, Vss. A control terminal of switch 71 is coupled to receive POR. The output of amplifier 54 is connected to a first data input of MUX 62 (also referred to as a first input terminal of MUX 62) and a positive input of comparator 64. A second data input of MUX 62 (also referred to as a second input terminal of MUX 62) is connected to a negative input of comparator 64. A first terminal of resistor 68 is connected to the third voltage supply terminal, Vdd, and a second terminal of resistor 68 is connected to the negative input of comparator 64 and to a first terminal of resistor 70. A second terminal of resistor 70 is connected to the second power supply terminal, Vss. An output of comparator 64 is connected to a non-inverting input of AND gate 66, and an inverting input of AND gate 66 is coupled to receive the resistor disable indicator. An output of AND gate 66 is connected to a select input of MUX 62 (also referred to as a control input of MUX 62). An output of MUX 62 is provided to comparator and PWM signal generator 14.

Note that amplifier 54, capacitor 58, and resistor 60 form an integrator. The integrator therefore has a first input terminal at the negative input of amplifier 54, a second input terminal at the positive input of amplifier 54 coupled to receive Vref, and an output terminal at the output of amplifier 54 which provides an integration error. Filter 78 is coupled to the first input terminal of the integrator.

During normal operation (after start-up), resistors 36-38 are shorted out by switch 48. In the illustrated embodiment, resistor disable circuit 52 detects when Vout has surpassed a low voltage reference, Vreflv. Resistor disable circuit compares Vout with Vreflv and upon Vout reaching Vreflv during start-up, resistor disable circuit 52 asserts resistor disable indicator (to a logic level high) in order to close switch 48, thus shorting out resistors 36-38. Also, when resistor disable indicator is asserted to a logic level high, the output of AND gate 66 is forced to a logic level low, regardless of the value at the non-inverting input of AND gate 66. Therefore, the first data input of MUX 62 (the output of amplifier 54) is provided as the output of MUX 62 to comparator and PWM signal generator 14. In this manner, the voltage clamp on the output of amplifier 54 provided by resistors 68 and 70 and comparator 64 is disabled during normal operation. Also, during normal operation, POR is no longer asserted (and is thus at a logic level zero); therefore, switch 56 is open and the negative input of amplifier 54 is no longer connected to Vdd. Therefore, during normal operation, Vout is provided to the negative input of amplifier 54 with resistors 36-38 being shorted. In this case, the RC time constant of filter 78 is primarily dependent upon capacitor 32 and resistor 34 (since resistors 36-38 are shorted out by switch 48). Note that due to the blocking effect of capacitor 32, resistor 30 minimally affects the RC time constant of filter 78. During normal operation, amplifier 54 provides the integration error between the filtered Vout at the negative input of amplifier 54 and Vref at the positive input of amplifier 54. This integration error at the output of amplifier 54 is provided to comparator and PWM signal generator 14 via MUX 62 for comparison with the saw tooth clock.

In response to a power-up or a reset, start-up begins. Initially, POR is asserted (to a logic level one) which closes switch 56, thus connecting the first terminal of capacitor 58 to Vdd. This starts the precharge of capacitor 58 and capacitor 32 (which precharge the negative input of amplifier 54 at circuit node 72). Also, with the assertion of POR, switch 71 is also closed which pulls the output of amplifier 54 to Vss (thus discharging the output of amplifier 54 at circuit node 74). This results in pulling the control electrode of transistor 16 to Vss as well, thus turning off transistor 16. Therefore, while POR is asserted, Vout remains at Vss. Also, each of resistors 36-38 is selectively coupled between Vout and the negative input of amplifier 54 as controlled by the outputs of slew rate control 50. (Since Vout, which is at Vss, has not yet reached Vreflv, switch 48 is open which allows switches 40-42 to control the resistance provided by resistors 36-38.) In one embodiment, each of resistors 36-38 is enabled (i.e. selectively coupled) by opening all of switches 40-42. Alternatively, slew rate control 50 may assert only a subset of the switch control signals to couple any subset of resistors 36-38. Slew rate control 50 may utilize a stored programmable value to determine which switch control signals to assert. Also, note that in alternate embodiments, fewer or greater than 3 selectably coupled resistors may be used within filter 78. In the case in which all resistors are coupled within filter 78, the RC time constant of filter 78 is dependent upon resistors 34 and 36-38 and capacitor 32. Therefore, as compared to normal operation, the RC time constant is increased with the enabling of resistors 36-38.

In one embodiment, POR is deasserted when Vddpwr reaches a predetermined higher power domain threshold. Upon the deassertion of POR, switches 56 and 71 are opened, releasing the output of amplifier 54 and the negative input of amplifier 54 from the precharging, allowing the output of amplifier 54 to be controlled by Vout. At this point, amplifier 54 provides the integration error between the filtered Vout at the negative input of amplifier 54 and Vref at the positive input of amplifier 54 to the first data input of MUX 62. The precharge of capacitor 58 and capacitor 32 ensures that the output of amplifier 54 begins low (since the negative input of amplifier 54 begins high at Vdd) and ramps up from there. Due to the increase in the RC time constant of filter 78, the output of amplifier 54 increases more slowly as it would without the presence of the additional resistance provided by resistors 36-38. This forces the duty cycle of the PWM signal to also increase at a slower rate. This allows for Vout to slowly ramp up to its targeted value without overshooting.

Furthermore, comparator 64 and the voltage divider formed by resistors 68 and 70 operate to clamp the output of MUX 62 (and thus the output of amplifier 54) from going too high. Comparator 64 compares the output of amplifier 54 with a reference voltage provided by node 76 of the voltage divider formed by resistors 68 and 70. While the output of amplifier 54 remains below the voltage of node 76, the output of comparator 64 is a logic level 0, thus allowing MUX 62 to continue to select the output of amplifier 54 to provide to comparator and PWM signal generator 14. However, when the output of amplifier 54 surpasses the voltage at node 76, the output of comparator 64 becomes a logic level high which results in MUX 62 selecting the voltage at node 76 to provide to comparator and PWM signal generator 14. Note that since the resistor disable indicator signal is a logic level zero during start-up (since Vout has not yet reached Vreflv), the output of AND gate 66 is controlled by its non-inverting input which is connected to the output of comparator 64. Once Vout reaches Vreflv, the resistor disable indicator signal is asserted to a logic level high and the output of AND gate 66 is forced to a logic level 0, thus selecting the output of amplifier 54 to be provided to comparator and PWM signal generator 14. In one embodiment, the values of resistors 68 and 70 are selected such that the voltage at the output of MUX 62 does not surpass the peak value of the saw tooth clock. For example, in one embodiment, resistors 68 and 70 are equal in value such that the output of MUX 62, during start-up, is not allowed to surpass ½ of Vdd.

Note that, during start-up, the additional resistance introduced by resistors 36-38 increases the RC time constant of filter 78 and slows the response of the closed loop, which reduces the bandwidth of the closed loop regulator system. This may allow the closed loop of regulator 10 to start up correctly, while removing the possibility of overshooting. That is, without the additional resistance, the slew rate of Vout can be too fast which results in a long PWM pulse, causing a fast ramp-up and a large overshoot for Vout. During normal operation, the RC time constant of compensator 12 is reduced thus increasing the bandwidth of the closed loop system and allowing regulator 10 to handle a variety of loads.

By now it should be appreciated that there has been provided switched mode voltage regulator having a compensator which includes a filter with a variable resistance. The variable resistance allows for the filter to have a slower RC time constant during start-up, so as to allow the regulator to ramp up slowly to prevent overshoot, while allowing the filter to have a faster RC time constant after start-up, such as during normal operation. In this manner, fast ramp and overshoot of the output of the switch mode voltage regulator may be reduced or prevented. Furthermore, the addition of a clamp circuit at the output of the compensator may further aid in preventing overshoot.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a voltage regulator including a transistor having a first current electrode coupled to a first power supply voltage terminal, a second current electrode coupled to an output terminal of the voltage regulator, and a control electrode; a first comparator having a first input terminal coupled to receive a clock signal, a second input terminal, and an output terminal coupled to the control electrode of the transistor; and a compensation circuit having a first input terminal coupled to receive a reference voltage, a second input terminal coupled to the output terminal of the voltage regulator, and an output terminal coupled to the second input terminal of the first comparator. The compensation circuit has a filter circuit, wherein the filter circuit has a first resistor-capacitor (RC) time constant during startup of the voltage regulator, and the filter circuit has a second RC time constant during normal operation, wherein the second RC time constant is different than the first RC time constant. Item 2 includes the voltage regulator of item 1, wherein the compensation circuit further includes an amplifier having a first input terminal coupled to the filter circuit, a second input terminal for receiving the reference voltage, and an output terminal; a first capacitor having a first plate electrode coupled to the first input terminal of the first amplifier, and a second plate electrode; and a first resistor having a first terminal coupled to the second plate electrode of the first capacitor, and a second terminal coupled to the output terminal of the amplifier. Item 3 includes the voltage regulator of item 2, wherein the filter circuit includes a second capacitor having a first plate electrode coupled to the output terminal of the voltage regulator, and a second plate electrode coupled to the first input terminal of the amplifier; and a plurality of resistance values that are selectively coupled between the output terminal of the voltage regulator and the first input terminal of the amplifier, wherein first and second RC time constants are provided by selecting one or more of the plurality of resistance values. Item 4 includes the voltage regulator of item 2, and further includes a voltage clamp circuit coupled to the output terminal of the amplifier, the voltage clamp circuit for preventing an output voltage at the output terminal of the amplifier from exceeding a voltage level of the reference voltage. Item 5 includes the voltage regulator of item 4, wherein the voltage clamp circuit includes a multiplexer having a first input terminal coupled to the output terminal of the first amplifier, a second input terminal, a control terminal, and an output terminal; a second comparator having a first input terminal coupled to the output terminal of the amplifier, a second input terminal, and an output terminal coupled to the control terminal of the multiplexer; and a voltage divider coupled to both the second input terminal of the multiplexer and the second input terminal of the second comparator. Item 6 includes the voltage regulator of item 2, and further includes a precharge circuit coupled to the first input terminal of the amplifier, the precharge circuit for precharging the first input terminal to a predetermined voltage in response to a power-on-reset signal. Item 7 includes the voltage regulator of item 1, wherein the reference voltage is characterized as being a bandgap generated reference voltage. Item 8 includes the voltage regulator of item 1, and further comprises an inductor-capacitor (LC) network coupled to the output terminal of the voltage regulator. Item 9 includes the voltage regulator of item 1, and further includes a semiconductor device having a first current electrode coupled to the second current of the transistor, and a second current electrode coupled to a second power supply voltage terminal. Item 10 includes the voltage regulator of item 9, wherein the semiconductor device is characterized as being a diode.

Item 11 includes a voltage regulator including a transistor having a first current electrode coupled to a first power supply voltage terminal, a second current electrode coupled to an output terminal of the voltage regulator, and a control electrode; a first comparator having a first input terminal coupled to receive a clock signal, a second input terminal, and an output terminal coupled to the control electrode of the transistor; and a compensation circuit. The compensation circuit includes an amplifier having a first input terminal, a second input terminal coupled to receive a reference voltage, and an output terminal; and a filter. The filter includes a first capacitor having a first plate electrode coupled to the output terminal of the voltage regulator, and a second plate electrode coupled to the first input terminal of the amplifier; and a plurality of resistance values selectively coupled between the output terminal of the voltage regulator and the first input terminal of the amplifier, wherein first and second RC time constants of the filter are provided by selecting one or more of the plurality of resistance values. Item 12 includes the voltage regulator of item 11, wherein the compensation circuit further includes a first capacitor having a first plate electrode coupled to the first input terminal of the amplifier, and a second plate electrode; and a first resistor having a first terminal coupled to the second plate electrode of the first capacitor, and a second terminal coupled to the output terminal of the amplifier. Item 13 includes the voltage regulator of item 12, and further includes a precharge circuit coupled to the first plate electrode of the first capacitor, the precharge circuit for precharging the first plate electrode of the first capacitor to a predetermined voltage in response to a power-on-reset (POR) signal. Item 14 includes the voltage regulator of item 12, wherein the first resistor-capacitor (RC) time constant is provided during startup of the voltage regulator, and the second RC time constant is provided during normal operation, wherein the second RC time constant is different than the first RC time constant. Item 15 includes the voltage regulator of item 12, and further includes a voltage clamp circuit coupled to the output terminal of the amplifier, the voltage clamp circuit for preventing an output voltage at the output terminal of the amplifier from exceeding a voltage level of the reference voltage. Item 16 includes the voltage regulator of item 15, wherein the voltage clamp circuit includes a multiplexer having a first input terminal coupled to the output terminal of the first amplifier, a second input terminal, a control terminal, and an output terminal; a second comparator having a first input terminal coupled to the output terminal of the amplifier, a second input terminal, and an output terminal coupled to the control terminal of the multiplexer; and a voltage divider coupled to both the second input terminal of the multiplexer and the second input terminal of the second comparator.

Item 17 includes a method for operating a voltage regulator. The voltage regulator includes a comparator, a transistor coupled to an output of the comparator, and a compensation circuit coupled to an input of the comparator. The compensation circuit has an integrator and a filter. The integrator has a first input terminal, a second input terminal for receiving a reference voltage, and an output terminal. The filter is coupled to the first input terminal of the integrator. The method includes precharging the first input terminal of the integrator; discharging the output terminal of the integrator; selecting a first resistor-capacitor (RC) time constant of the filter; detecting that a regulated power supply voltage from an output terminal of the voltage regulator is at a predetermined voltage level; and selecting a second RC time constant of the filter, the second RC time constant being different from the first RC time constant. Item 18 includes the method of item 17, wherein selecting the first RC time constant of the filter comprises selecting one or more of a plurality of resistance values of the filter, and wherein selecting the second RC time constant comprises selecting one or more different resistance values of the filter. Item 19 includes the method of item 17, wherein precharging the first input terminal of the integrator further comprises precharging the first input terminal of the integrator in response to a power-on-reset signal. Item 20 includes the method of item 17, and further includes clamping a voltage at the output of the amplifier to a predetermined voltage level.

The invention claimed is:

1. A voltage regulator comprising:
a transistor having a first current electrode coupled to a first power supply voltage terminal, a second current electrode coupled to an output terminal of the voltage regulator, and a control electrode;
a first comparator having a first input terminal coupled to receive a clock signal, a second input terminal, and an output terminal coupled to the control electrode of the transistor; and
a compensation circuit having a first input terminal coupled to receive a reference voltage, a second input terminal coupled to the output terminal of the voltage regulator, and an output terminal coupled to the second input terminal of the first comparator, the compensation circuit having a filter circuit, wherein the filter circuit has a first resistor-capacitor (RC) time constant during startup of the voltage regulator, and the filter circuit having a second RC time constant during normal operation, wherein the second RC time constant is less than the first RC time constant.

2. The voltage regulator of claim 1, wherein the compensation circuit further comprises:
an amplifier having a first input terminal coupled to the filter circuit, a second input terminal for receiving the reference voltage, and an output terminal;
a first capacitor having a first plate electrode coupled to the first input terminal of the first amplifier, and a second plate electrode; and
a first resistor having a first terminal coupled to the second plate electrode of the first capacitor, and a second terminal coupled to the output terminal of the amplifier.

3. The voltage regulator of claim 2, wherein the filter circuit comprises:
a second capacitor having a first plate electrode coupled to the output terminal of the voltage regulator, and a second plate electrode coupled to the first input terminal of the amplifier; and
a plurality of resistance values that are selectively coupled between the output terminal of the voltage regulator and the first input terminal of the amplifier, wherein first and second RC time constants are provided by selecting one or more of the plurality of resistance values.

4. The voltage regulator of claim 2, further comprising a voltage clamp circuit coupled to the output terminal of the amplifier, the voltage clamp circuit for preventing an output voltage at the output terminal of the amplifier from exceeding a voltage level of the reference voltage.

5. The voltage regulator of claim 2, further comprising a precharge circuit coupled to the first input terminal of the amplifier, the precharge circuit for precharging the first input terminal to a predetermined voltage in response to a power-on-reset signal.

6. The voltage regulator of claim 1, wherein the reference voltage is characterized as being a bandgap generated reference voltage.

7. The voltage regulator of claim 1, further comprising an inductor-capacitor (LC) network coupled to the output terminal of the voltage regulator.

8. The voltage regulator of claim 1, further comprising a semiconductor device having a first current electrode coupled to the second current electrode of the transistor, and a second current electrode coupled to a second power supply voltage terminal.

9. The voltage regulator of claim 8, wherein the semiconductor device is characterized as being a diode.

10. A voltage regulator comprising:
a transistor having a first current electrode coupled to a first power supply voltage terminal, a second current electrode coupled to an output terminal of the voltage regulator, and a control electrode;
a first comparator having a first input terminal coupled to receive a clock signal, a second input terminal, and an output terminal coupled to the control electrode of the transistor; and
a compensation circuit having a first input terminal coupled to receive a reference voltage, a second input terminal coupled to the output terminal of the voltage regulator, and an output terminal coupled to the second input terminal of the first comparator, the compensation circuit having a filter circuit, wherein the filter circuit has a first resistor-capacitor (RC) time constant during startup of the voltage regulator, and the filter circuit having a second RC time constant during normal operation, wherein the second RC time constant is different than the first RC time constant;
wherein the compensation circuit further comprises:
an amplifier having a first input terminal coupled to the filter circuit, a second input terminal for receiving the reference voltage, and an output terminal;
a first capacitor having a first plate electrode coupled to the first input terminal of the first amplifier, and a second plate electrode; and
a first resistor having a first terminal coupled to the second plate electrode of the first capacitor, and a second terminal coupled to the output terminal of the amplifier
a voltage clamp circuit coupled to the output terminal of the amplifier, the voltage clamp circuit for preventing an output voltage at the output terminal of the amplifier from exceeding a voltage level of the reference voltage
wherein the voltage clamp circuit comprises:
a multiplexer having a first input terminal coupled to the output terminal of the first amplifier, a second input terminal, a control terminal, and an output terminal;
a second comparator having a first input terminal coupled to the output terminal of the amplifier, a second input terminal, and an output terminal coupled to the control terminal of the multiplexer; and
a voltage divider coupled to both the second input terminal of the multiplexer and the second input terminal of the second comparator.

11. A voltage regulator comprising:
a transistor having a first current electrode coupled to a first power supply voltage terminal, a second current electrode coupled to an output terminal of the voltage regulator, and a control electrode;
a first comparator having a first input terminal coupled to receive a clock signal, a second input terminal, and an output terminal coupled to the control electrode of the transistor; and
a compensation circuit comprising:
an amplifier having a first input terminal, a second input terminal coupled to receive a reference voltage, and an output terminal; and
a filter comprising:
a first capacitor having a first plate electrode coupled to the output terminal of the voltage regulator, and a second plate electrode coupled to the first input terminal of the amplifier; and
a plurality of resistance values selectively coupled between the output terminal of the voltage regulator and the first input terminal of the amplifier, wherein first and second RC time constants of the filter are provided by selecting one or more of the plurality of resistance values
wherein the first resistor-capacitor (RC) time constant is provided during startup of the voltage regulator, and the second RC time constant is provided during normal operation, wherein the second RC time constant is less than the first RC time constant.

12. The voltage regulator of claim 11 wherein the compensation circuit further comprises:
a second capacitor having a first plate electrode coupled to the first input terminal of the amplifier, and a second plate electrode; and
a first resistor having a first terminal coupled to the second plate electrode of the second capacitor, and a second terminal coupled to the output terminal of the amplifier.

13. The voltage regulator of claim 12, further comprising a precharge circuit coupled to the first plate electrode of the second capacitor, the precharge circuit for precharging the first plate electrode of the second capacitor to a predetermined voltage in response to a power-on-reset signal.

14. A voltage regulator comprising:
a transistor having a first current electrode coupled to a first power supply voltage terminal, a second current electrode coupled to an output terminal of the voltage regulator, and a control electrode;
a first comparator having a first input terminal coupled to receive a clock signal, a second input terminal, and an output terminal coupled to the control electrode of the transistor; and
a compensation circuit comprising:
an amplifier having a first input terminal, a second input terminal coupled to receive a reference voltage, and an output terminal; and
a filter comprising:
a first capacitor having a first plate electrode coupled to the output terminal of the voltage regulator, and a second plate electrode coupled to the first input terminal of the amplifier; and
a plurality of resistance values selectively coupled between the output terminal of the voltage regulator and the first input terminal of the amplifier, wherein first and second RC time constants of the filter are provided by selecting one or more of the plurality of resistance values;
a voltage clamp circuit coupled to the output terminal of the amplifier, the voltage clamp circuit for preventing an output voltage at the output terminal of the amplifier from exceeding a voltage level of the reference voltage
wherein the voltage clamp circuit comprises:
a multiplexer having a first input terminal coupled to the output terminal of the first amplifier, a second input terminal, a control terminal, and an output terminal;
a second comparator having a first input terminal coupled to the output terminal of the amplifier, a second input terminal, and an output terminal coupled to the control terminal of the multiplexer; and
a voltage divider coupled to both the second input terminal of the multiplexer and the second input terminal of the second comparator.

15. In a voltage regulator having a comparator, a transistor coupled to an output of the comparator, and a compensation circuit coupled to an input of the comparator, the compensation circuit comprising an integrator and a filter, the integrator having a first input terminal, a second input terminal for receiving a reference voltage, and an output terminal, the filter coupled to the first input terminal of the integrator, a method for operating the voltage regulator, the method comprising:
precharging the first input terminal of the integrator;
discharging the output terminal of the integrator;
selecting a first resistor-capacitor (RC) time constant of the filter for startup of the voltage regulator;
detecting that a regulated power supply voltage from an output terminal of the voltage regulator is at a predetermined voltage level; and
selecting a second RC time constant of the filter for normal operation of the voltage regulator, the second RC time constant being less than the first RC time constant.

16. The method of claim 15, wherein selecting the first RC time constant of the filter comprises selecting one or more of a plurality of resistance values of the filter, and wherein selecting the second RC time constant comprises selecting one or more different resistance values of the filter.

17. The method of claim 15, wherein precharging the first input terminal of the integrator further comprises precharging the first input terminal of the integrator in response to a power-on-reset signal.

18. The method of claim 15, further comprising clamping a voltage at the output of the amplifier to a predetermined voltage level.

* * * * *